(12) United States Patent
Cant

(10) Patent No.: US 11,770,082 B2
(45) Date of Patent: Sep. 26, 2023

(54) ELECTRIC MOTOR FOR VISCOUS PUMPING

(71) Applicant: Sola Sewers Pty Ltd, Notting Hill (AU)

(72) Inventor: Lucas Robert Cant, Notting Hill (AU)

(73) Assignee: Sola Sewers Pty Ltd

(*) Notice: Subject to any disclaimer, the term of this patent is extended or adjusted under 35 U.S.C. 154(b) by 0 days.

(21) Appl. No.: 17/278,402

(22) PCT Filed: Sep. 19, 2019

(86) PCT No.: PCT/AU2019/051001
§ 371 (c)(1),
(2) Date: Mar. 22, 2021

(87) PCT Pub. No.: WO2020/056462
PCT Pub. Date: Mar. 26, 2020

(65) Prior Publication Data
US 2021/0359627 A1    Nov. 18, 2021

(30) Foreign Application Priority Data
Sep. 21, 2018  (AU) ................. 2018903569

(51) Int. Cl.
*H02P 6/28* (2016.01)
*H02P 29/66* (2016.01)
(Continued)

(52) U.S. Cl.
CPC .................. *H02P 6/28* (2016.02); *F04D 7/00* (2013.01); *F04D 13/08* (2013.01); *H02P 6/16* (2013.01);
(Continued)

(58) Field of Classification Search
CPC .. H02P 6/28; H02P 29/662; H02P 6/16; H02P 2203/05; H02P 2207/055; F04D 7/00; F04D 13/08
See application file for complete search history.

(56) References Cited

U.S. PATENT DOCUMENTS

| 5,708,337 A | 1/1998 | Breit et al. |
| 2007/0013241 A1* | 1/2007 | Schiferl ............... H02K 15/024 310/58 |

(Continued)

OTHER PUBLICATIONS

Written Opinion of the International Searching Authority issued in connection with PCT/AU2019/051001.
(Continued)

*Primary Examiner* — Zoheb S Imtiaz
(74) *Attorney, Agent, or Firm* — Akerman LLP

(57) ABSTRACT

An electric motor for viscous pumping, wherein the electric motor is a brushless DC motor configured to be driven by a low DC voltage of around 40-60 VDC, and includes: a rotor with permanent magnets; a stator with a stack of laminations and windings wound therearound; and a controller to provide electronic commutation of electric current flowing through the windings; wherein the windings and the stack of laminations are configured to handle at least 1 kW of continuous electric power from the controller, and the controller includes a feedback circuit including a rotation sensor coupled to the rotor and having an angular resolution of at least 1/500th of a revolution to allow the controller to control the torque generated by the electric motor to a corresponding extent.

20 Claims, 12 Drawing Sheets

(51) Int. Cl.
  *F04D 7/00*    (2006.01)
  *F04D 13/08*   (2006.01)
  *H02P 6/16*    (2016.01)

(52) U.S. Cl.
  CPC ........ *H02P 29/662* (2016.11); *H02P 2203/05* (2013.01); *H02P 2207/055* (2013.01)

(56) References Cited

U.S. PATENT DOCUMENTS

| | | | |
|---|---|---|---|
| 2011/0133682 A1* | 6/2011 | Egger | H02P 8/38 |
| | | | 318/685 |
| 2014/0191602 A1* | 7/2014 | Hardway | H02K 5/132 |
| | | | 310/156.01 |
| 2014/0265662 A1* | 9/2014 | Shoykhet | H02K 1/20 |
| | | | 310/59 |
| 2015/0224845 A1 | 8/2015 | Anderson et al. | |
| 2021/0359627 A1* | 11/2021 | Cant | H02P 29/662 |

OTHER PUBLICATIONS

International Search Report issued in connection with PCT/AU2019/051001.

* cited by examiner

ELECTRIC MOTOR FOR VISCOUS PUMPING

CROSS-REFERENCE TO RELATED APPLICATIONS

This application is a national phase of PCT/AU2019/051001, filed Sep. 19, 2019, and claims priority to Australian Patent Application No. 2018903569, filed Sep. 21, 2018, the entire contents of both of which are hereby incorporated by reference.

TECHNICAL FIELD

The present invention relates to electric motor technology, and in particular to an improved type of electric motor that is particularly well suited for applications where the motor may need to provide variable high torques to maintain rotational speed under correspondingly variable loads, such as viscous pumping, for example, including sewage pumping.

BACKGROUND

Increasing urbanisation is leading to a shortage of viable land above or easily accessible to existing sewer mains systems. This shortage has prompted the development of various methods of transferring sewage from points of origin to the sewer main for treatment. The most popular method is to install a local pressurised feed to pump the sewage "uphill" and inject it under pressure into the existing sewer mains. This technique is gaining in popularity in first world urban applications because it offers a number of advantages. Firstly, economically the pressure pipe is smaller and is cheaper to install, secondly some sewage pre-treatment is done by the pumping operation, and thirdly it opens the way for smart pumping technologies to time sewage flow along the entire system. However, for many installations this requires an electric motor that is capable of operating off grid, powered only by alternative energy generators and/or battery systems.

This application generally requires a submersible pump to pump sewage from a local building tank or cistern into a main sewage line. The pump motor needs to be remotely controlled to ensure that the local tank does not overflow. The pump also includes a cutting and grinding attachment that masticates the raw sewage before pumping it at pressure into the sewer mains. The motor therefore needs to be able to drive a pump with a difficult load, because the pump is chopping and grinding various organic waste and inorganic contaminants.

In this context, the inventor has determined that the pump motor needs to meet several requirements. Firstly, the motor requires significant power (~1 kW) to operate at a level that is economically and technically viable. However, at this power level, conventional electric motors are wound for higher voltages, traditionally >100V ac/dc.

In addition, the starting torque is considerable because the motor needs to be able to pump into a full pressure supply line, operate the grinder, and cope with the difficult non-linear pump torque profile. In particular, the inventor has determined that the required torque typically varies within single rotations, and the motor needs to be able to deliver that variable torque. As indicated above, the type of pump employed for this application offers a challenging non-constant load to the motor, and the cutting attachment provides another randomly variable load to contend with.

Current alternative energy technology places the available voltage for the motor being delivered by alternative energy techniques in the 24-48 VDC range, which is too low for off-the-shelf electric motors.

Others in the field have been investigating operating AC electric motors by connecting a mains voltage (i.e., 110 or 240 VAC) inverter to a battery bank (charged by an off-grid power source such as a solar or wind driven generator) and connecting it to a commercial pressure sewer pump. However, the inventor has identified that these arrangements are sub-optimal in a number of ways. In particular, current technology mains inverters have significant quiescent current requirements, which place a constant drain on the battery system. Mains inverters are also not suitable for driving the peculiar pump load, adding further inefficiencies. Moreover, the AC motors do not provide sufficient starting torque to reliably operate the pump. These difficulties, when added to the limited available energy for charging the batteries, means that these systems struggle to operate successfully or require an energy input that is uneconomic. In view of the above, the inventor has identified a general need for a low voltage and high torque electric motor that is capable of driving variable loads.

It is desired, therefore, to provide an electric motor that alleviates one or more difficulties of the prior art, or to at least provide a useful alternative.

SUMMARY

In accordance with some embodiments of the present invention, there is provided an electric motor for viscous pumping,
   wherein the electric motor is a brushless DC motor configured to be driven by a low DC voltage of around 40-60 VDC, and includes:
      a rotor with permanent magnets;
      a stator with a stack of laminations and windings wound therearound; and
      a controller to provide electronic commutation of electric current flowing through the windings;
   wherein the windings and the stack of laminations are configured to handle at least 1 kW of continuous electric power from the controller, and the controller includes a feedback circuit including a rotation sensor coupled to the rotor and having an angular resolution of at least 1/500th of a revolution to allow the controller to control the torque generated by the electric motor to a corresponding extent.

In some embodiments, the electric motor includes a PWM (pulse-width modulation) component to generate the electric current, and a filter component configured to filter noise generated by the PWM component.

In some embodiments, the filter component includes an analogue filter to filter noise generated by the PWM component from the feedback circuit.

In some embodiments, the filter component includes a digital filter to filter noise generated by the PWM component.

In some embodiments, the electric motor includes Hall sensors to generate rotor position signals for use by the controller to determine rotational positions of the rotor for said electronic commutation, wherein the controller is configured to selectively use only either the Hall sensors or the rotation sensor to control the electric current flowing through the windings, in dependence of the rotor's rotational speed.

In some embodiments, the laminations are configured with a large back path to avoid or reduce magnetic saturation of the laminations.

In some embodiments, the stack of laminations has a thickness along a longitudinal axis of the rotor such that the electric motor can output a torque of at least 6-8 Nm.

In some embodiments, the stack of laminations is skewed to smooth torque fluctuations of the motor.

In some embodiments, each of the laminations includes teeth radially directed toward permanent magnets of the rotor, facing surfaces of the teeth and the permanent magnets being configured so that a corresponding magnetic field profile substantially minimises the mean and impulse current referred to the windings.

In some embodiments, each of the laminations includes teeth radially directed toward permanent magnets of the rotor, facing surfaces of the teeth and the permanent magnets being configured to reduce magnetic and quiescent losses.

In some embodiments, the electric motor includes a temperature sensor to generate a signal indicative of a temperature of the permanent magnets of the rotor, the signal being coupled to an input of the controller, the controller being further configured to control the electric current flowing through the windings to avoid thermal damage to the permanent magnets.

In some embodiments, the electric motor includes a temperature sensor to generate a signal indicative of a temperature of the permanent magnets of the rotor, the signal being coupled to an input of the controller, the controller being further configured to control the electric current flowing through the windings to avoid thermal damage to the permanent magnets.

In some embodiments, the windings and the stack of laminations are configured to handle at least 1-2 kW of continuous electric power from the controller.

In some embodiments, the windings and the stack of laminations are configured to handle at least 3 kW of peak electric power from the controller during startup.

In some embodiments, the electric motor includes a DC power supply component to generate DC power for the electric motor from AC mains power so that the electric motor can be powered from AC mains power.

In accordance with some embodiments of the present invention, there is provided a method of producing an electric motor for viscous pumping, including the steps of:
  providing a rotor with permanent magnets;
  coupling the rotor to a rotation sensor having an angular resolution of at least 1/500th of a revolution;
  forming a stator with a stack of laminations and winding wire windings therearound such that the windings and the stack of laminations are configured to handle at least 1 kW of continuous electric power; and
  forming a controller to provide electronic commutation of electric current flowing through the windings, wherein the controller includes a feedback circuit coupled to the rotation sensor to allow the controller to control the torque generated by the electric motor to a corresponding extent;
  wherein the electric motor is a brushless DC motor configured to be driven by a low DC voltage of around 40-60 VDC.

In some embodiments, the method includes obtaining a brushless DC motor configured to be driven by a low DC voltage of around 40-60 VDC, the brushless DC motor including:
  the rotor with permanent magnets;
  a stator with a second stack of laminations and second windings wound therearound; and
  a controller to provide electronic commutation of electric current flowing through the windings;
  wherein the step of forming the stator includes removing the second stack of laminations and second windings wound therearound and replacing them with the laminations and above windings
  connecting the rotation sensor to the feedback circuit of the controller.

In some embodiments, the controller includes a PWM (pulse-width modulation) component to generate the electric current, and a filter component configured to filter noise generated by the PWM component, and the method includes the step of tuning the filter component to minimize noise in the feedback circuit of the controller.

BRIEF DESCRIPTION OF THE DRAWINGS

Some embodiments of the present invention are hereinafter described, by way of example only, with reference to the accompanying drawings, wherein.

DETAILED DESCRIPTION

Embodiments of the present invention include a high torque and low voltage electric motor that is suitable for driving unpredictably variable loads such as experienced when the motor is used to pump viscous fluids such as raw sewage, for example. Generally, the motor is configured to be driven by a low voltage in the range of about 40 to 60 VDC, and most typically about 50 VDC, such as the industry standard voltage of 48 VDC.

Although embodiments of the invention are described in the context of a raw sewage pump, it will be apparent to those skilled in the art that the motor can be applied to any application where a low voltage electric motor is required to provide a high torque. Other pumping applications for the electric motor include bore water pumping and other forms of irrigation, mining, et cetera. Many other applications of the motor will be apparent to those skilled in the art in light of this disclosure.

Figure 1:
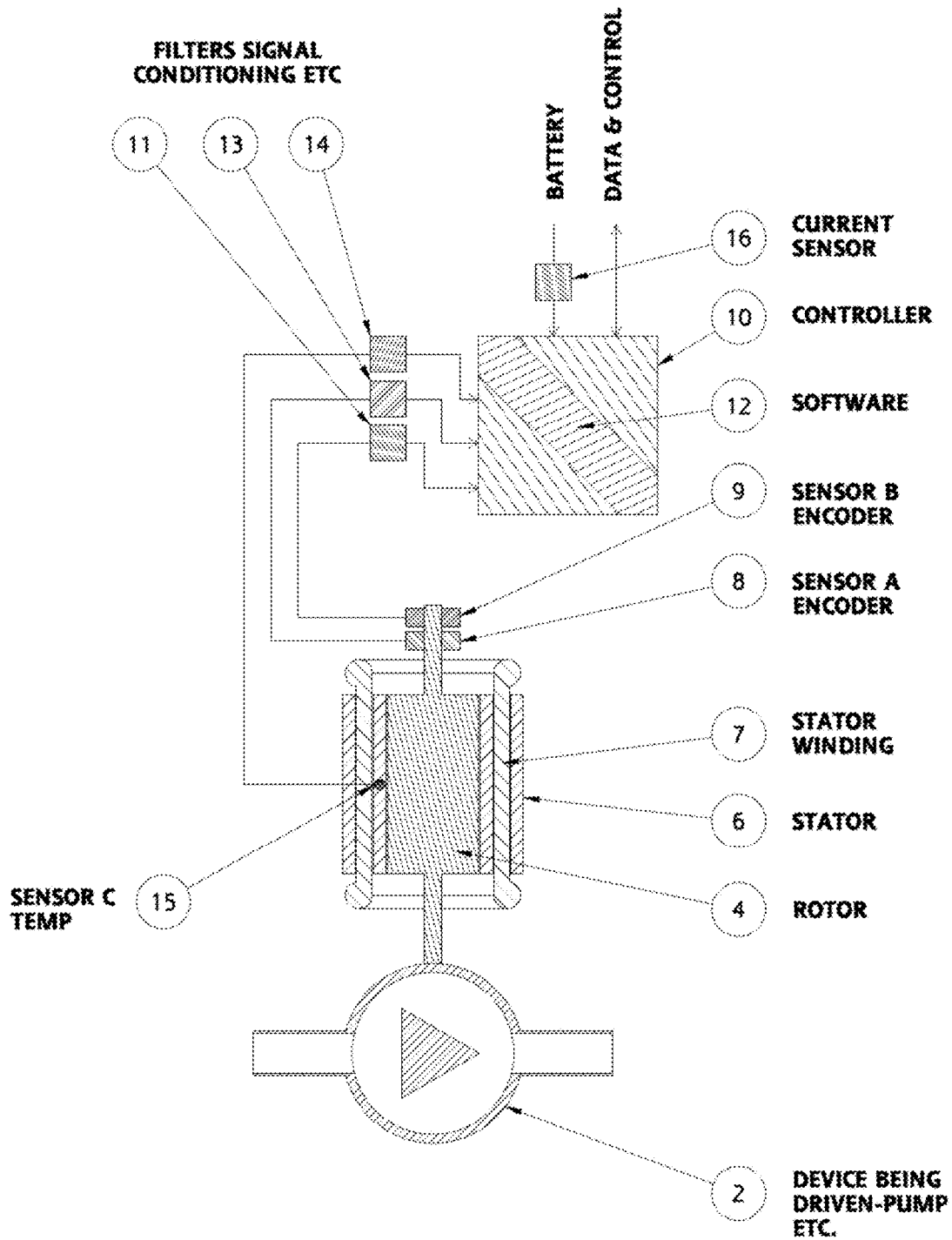
FIG. 1 is a schematic diagram of an electric motor in accordance with an embodiment of the present invention, being used to drive a pump.
Figure 2:
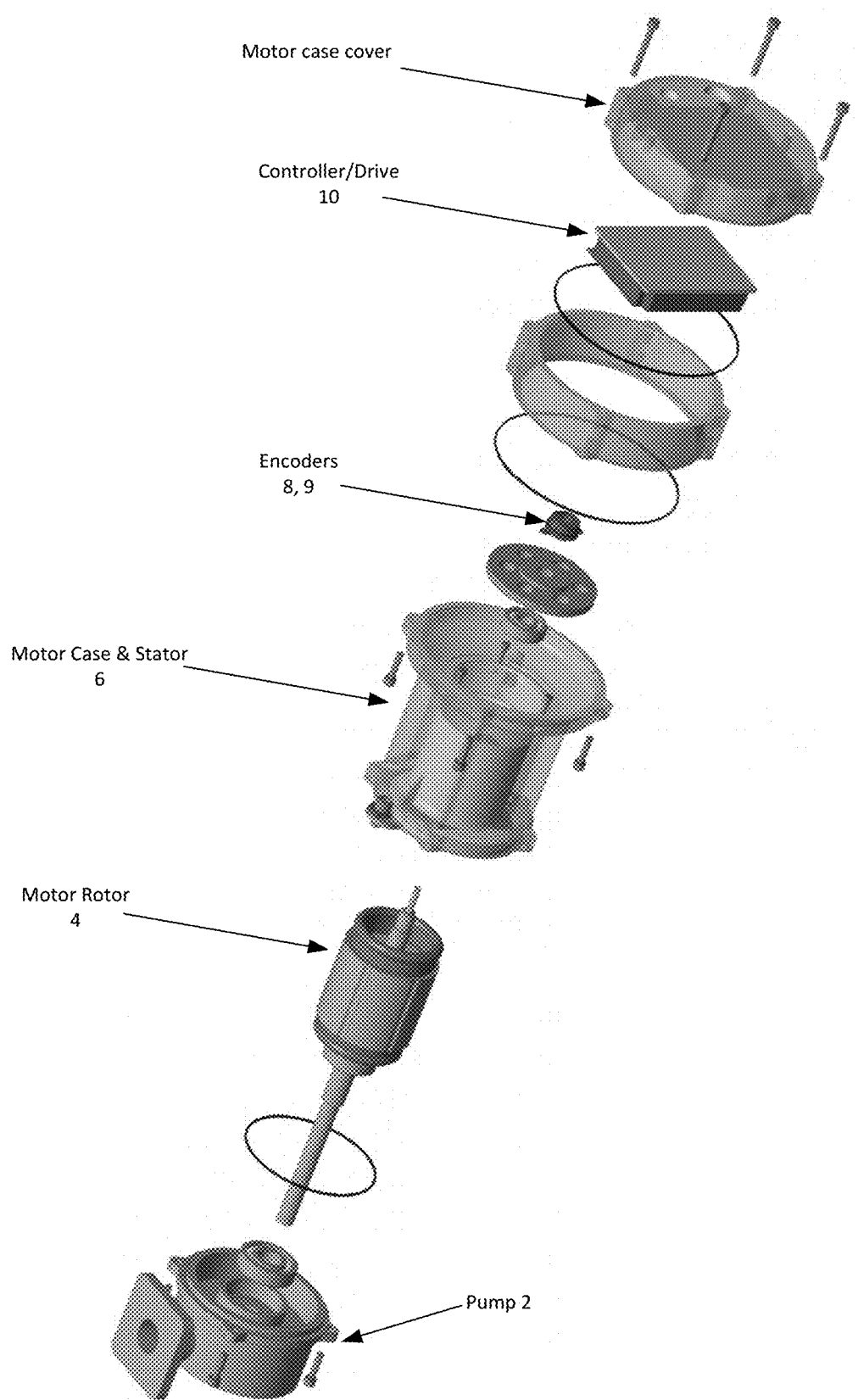
FIGS. 2 and 3 are exploded and assembled views of the electric motor of FIG. 1.
Figure 3:
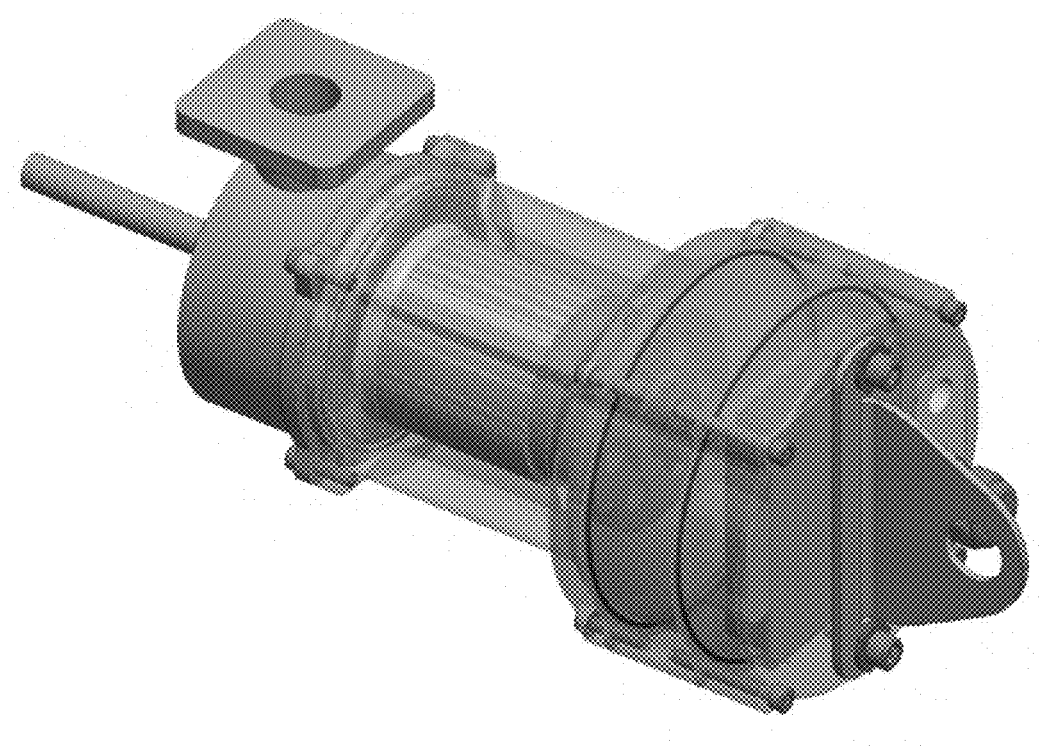
Figure 4:
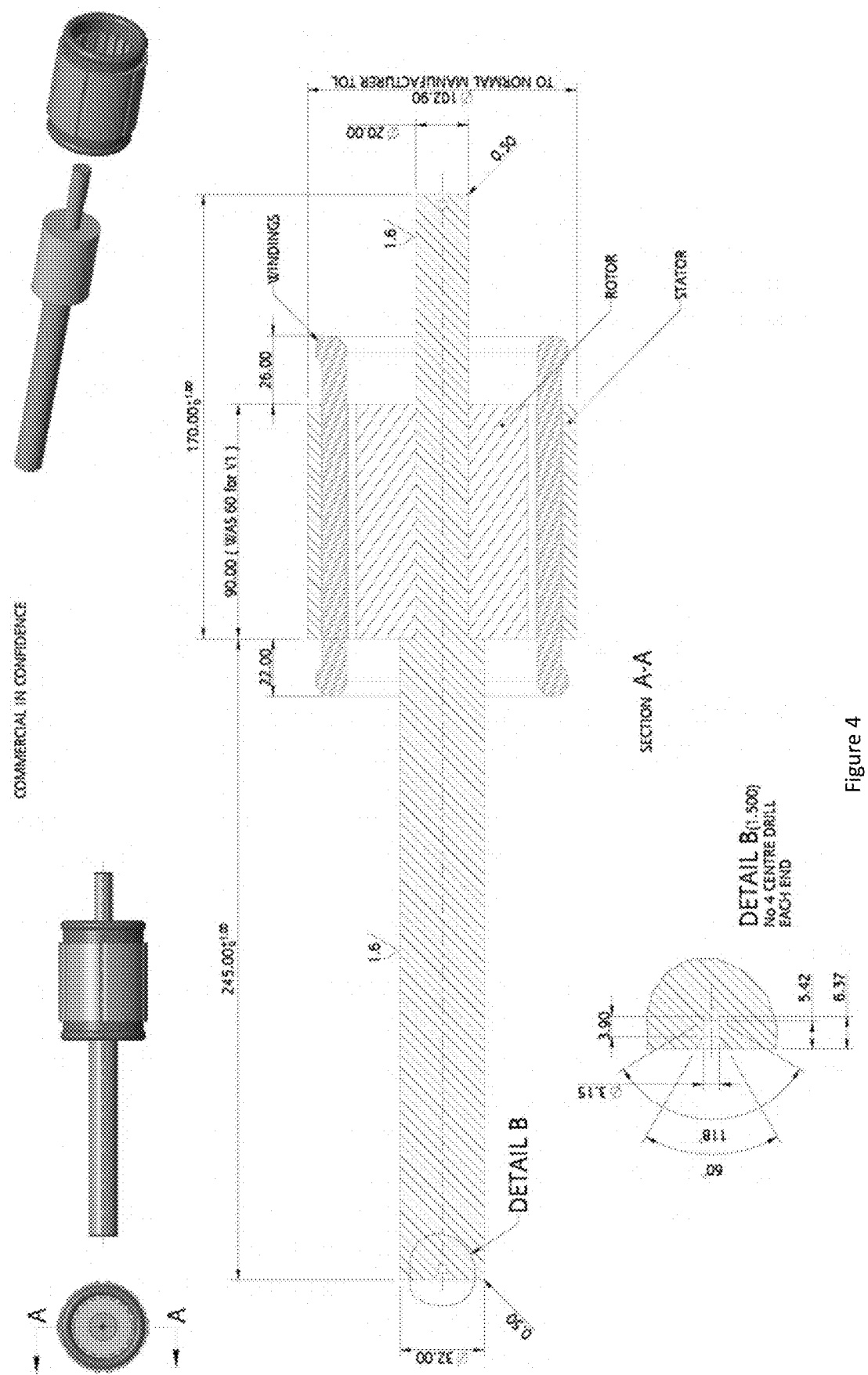
FIG. 4 includes a cross-sectional side view of a rotor assembly of the electric motor.
Figure 5:
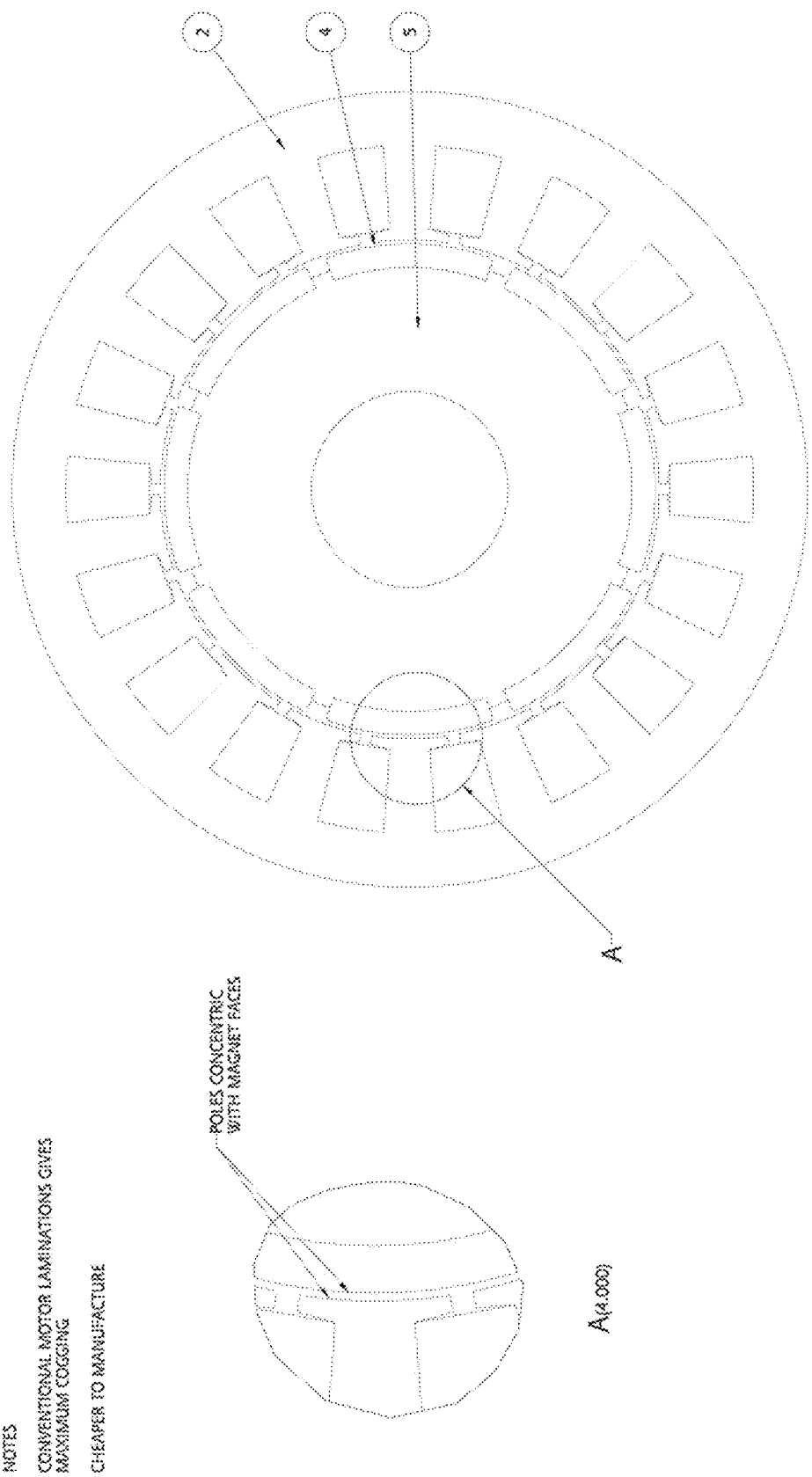
FIG. 5 is a plan view of a prior art rotor and stator lamination.
Figure 6:
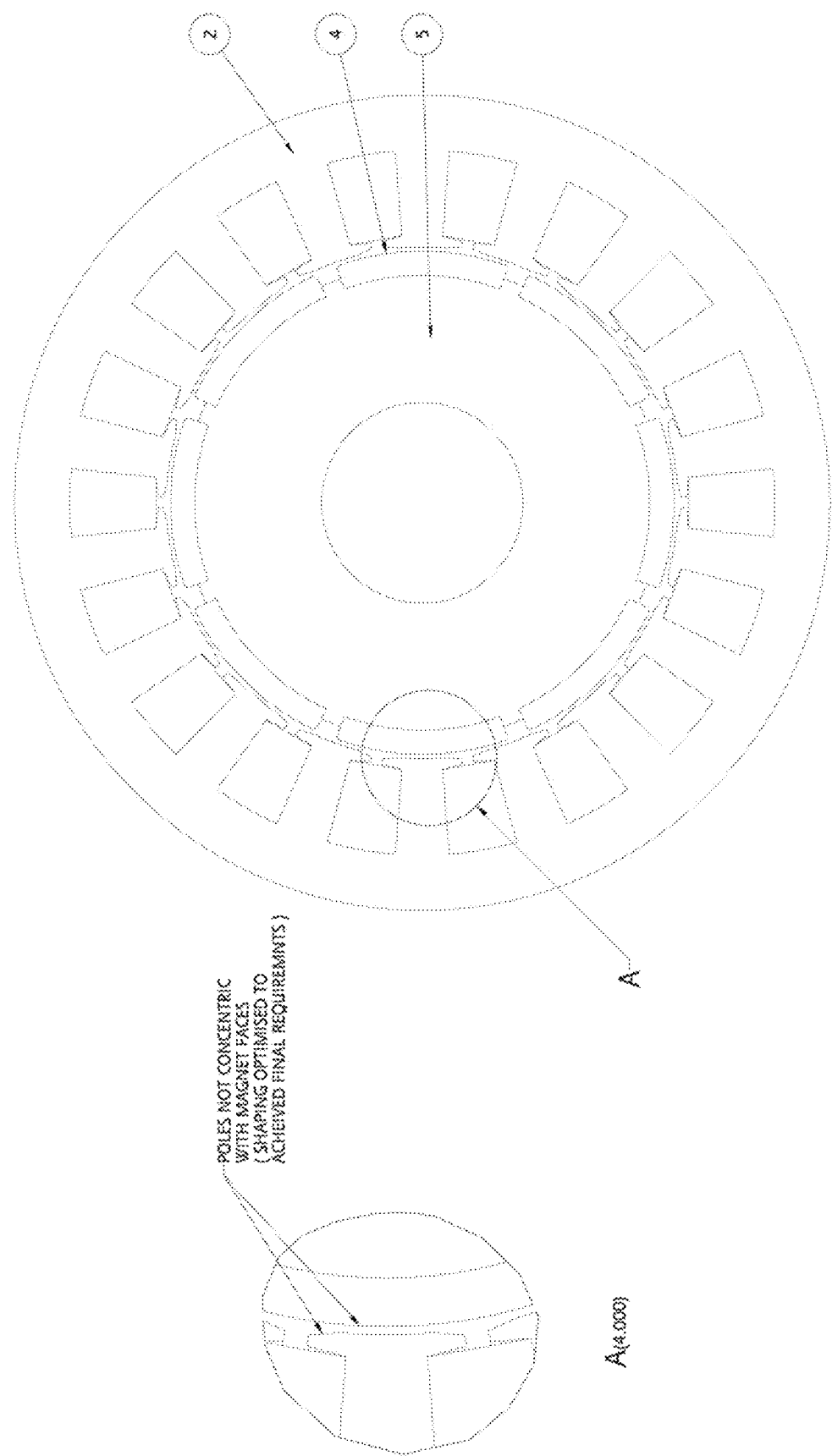
FIG. 6 is a plan view of the rotor and a stator lamination in accordance with some embodiments of the present invention.
Figure 7:
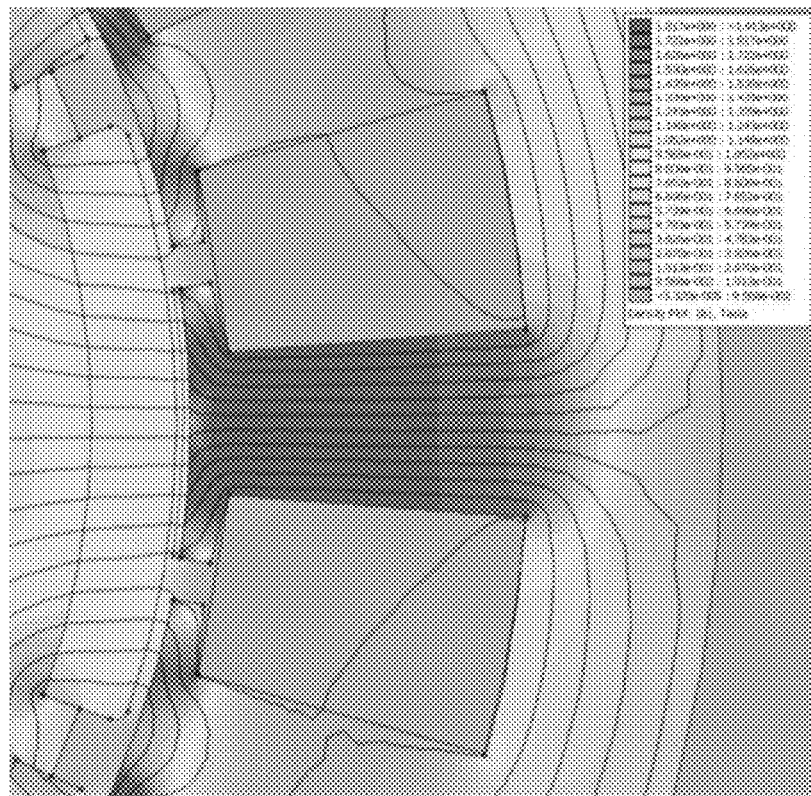
FIG. 7 shows simulated magnetic fields in a section of the prior art stator lamination of FIG. 5 (the rotor stator gaps have been enlarged for clarity)
Figure 8:
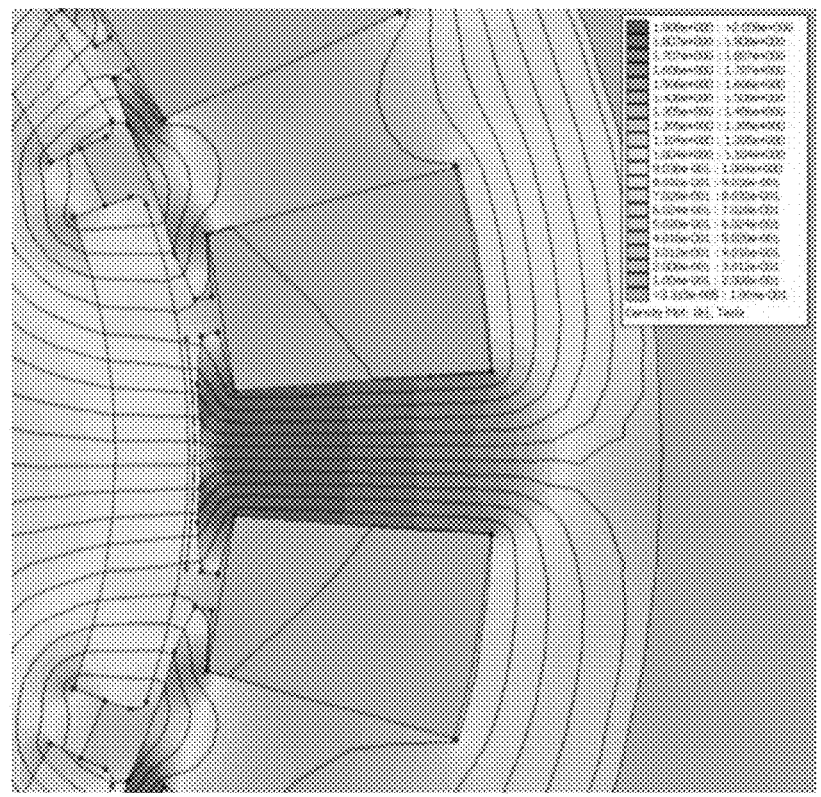
FIG. 8 shows simulated magnetic fields in a section of the stator lamination of FIG. 6 (the rotor stator gaps have been enlarged for clarity)
Figure 9:
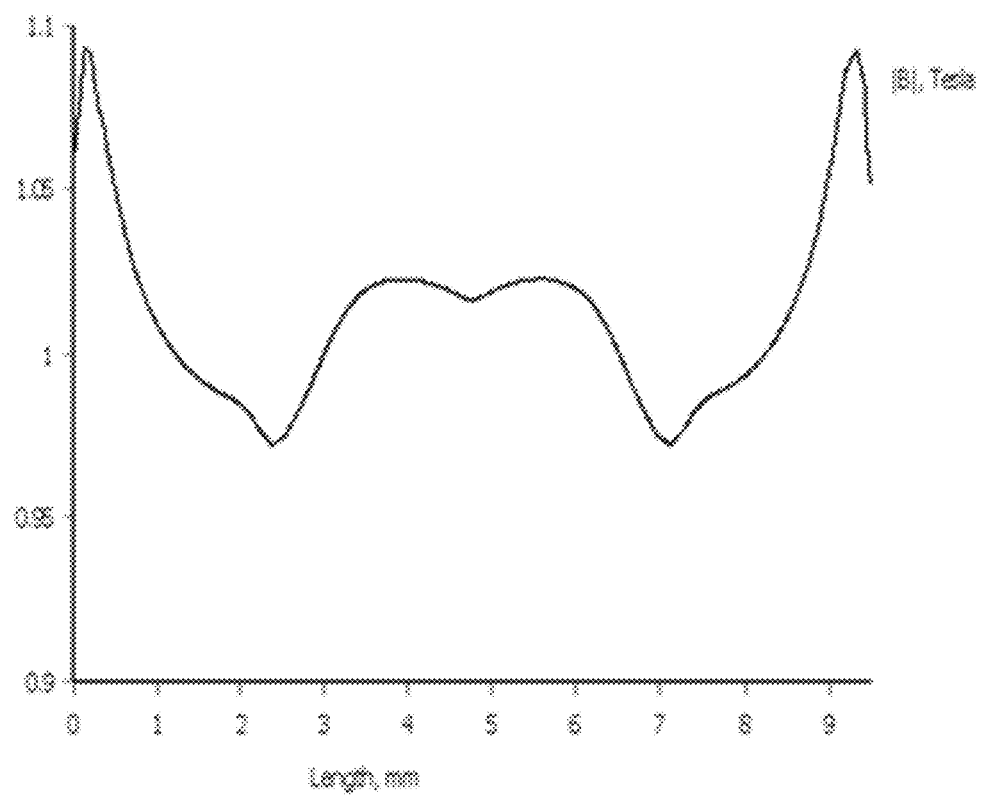
FIG. 9 is a graph of magnetic field strength in the original pole gap as a function of distance along an arc extending along the centre of the gap from one edge of a pole to the other edge of that pole.
Figure 10:
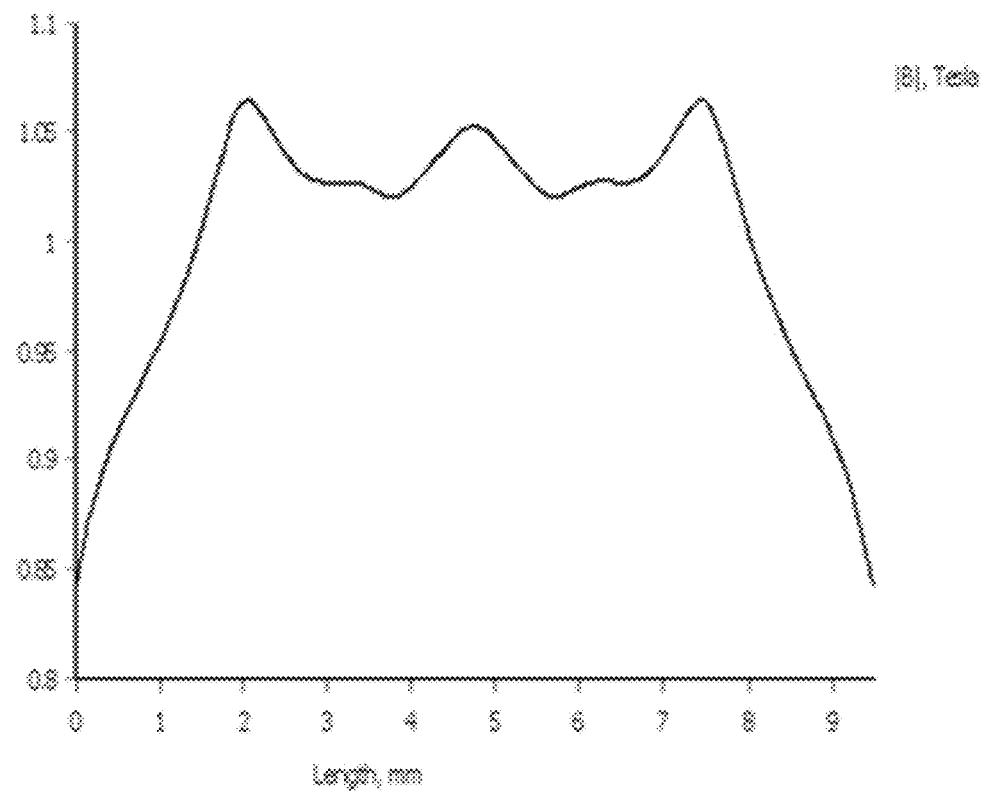
FIG. 10 is a graph of magnetic field strength in the modified pole gap as a function of distance along an arc extending along the centre of the gap from one edge of a modified pole to the other edge of that pole.
Figure 11:
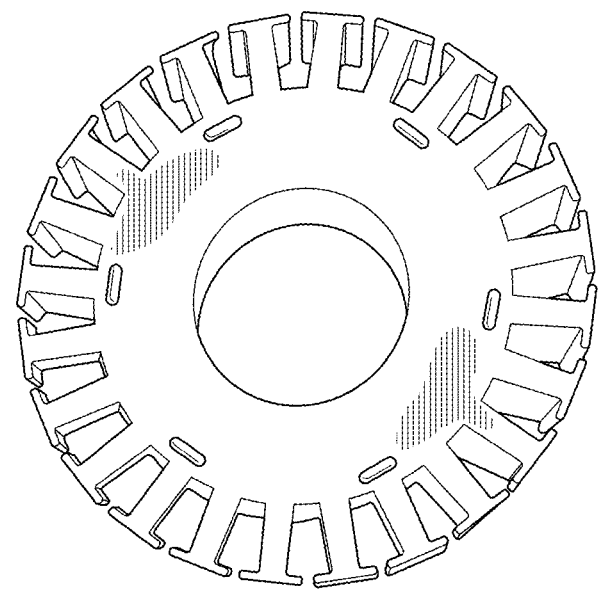
FIG. 11 is a photograph of a stator lamination stack in accordance with some embodiments of the present invention.
Figure 11:
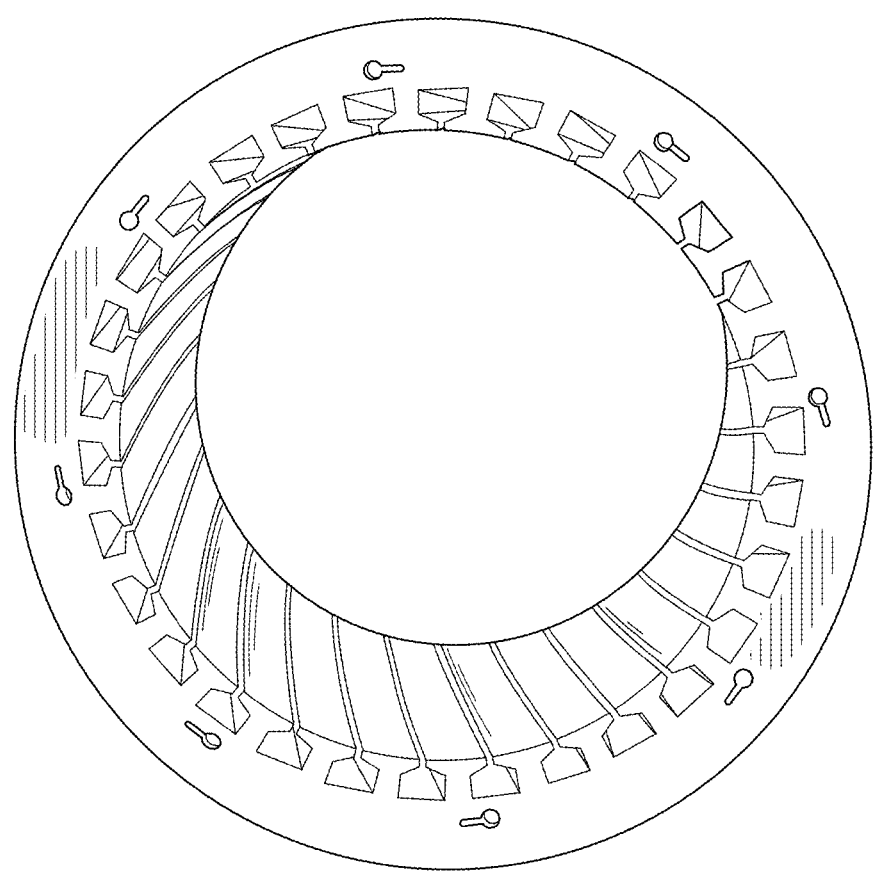

As shown in FIG. 1, an electric motor is a brushless DC motor that includes a generally cylindrical rotor 4 with permanent magnets mounted thereon. The rotor 4 is disposed within a concentric and generally cylindrical stator 6 with stator windings 7. The stator windings 7 are energised by a controller 10 that receives low voltage DC power from a renewable energy source such as battery storage that is recharged by a renewable energy generator (not shown) such as a photovoltaic solar cell and/or a wind powered generator, for example. The current flowing to the controller 10 (from the battery in this embodiment) is monitored by a current sensor 16. The controller 10 energises the stator windings 7 with a varying drive signal that causes the stator to generate correspondingly varying magnetic fields that interact with the permanent magnets of the rotor 4 to cause the rotor 4 to rotate about its longitudinal axis and thus mechanically drive a load 2 coupled to one end of a drive shaft of the rotor, in the context of the described embodiment being a sewage pump 2 as described above. In the described embodiment, the controller 10 is located remotely (at a distance of about 15 m in the described embodiment) from the submersed motor and pump. However, in alternative embodiments, the controller 10 and the pump 2 are co-located and are both submersed so that only the battery power lines and monitoring cables run from the sewage tank. For example, in some embodiments, the controller 10 and the pump 2 are within a common housing, and in some embodiments the controller 10 is located within the cast body of the motor.

In one embodiment, as shown in FIG. 1, two encoders 8, 9 are coupled to an opposite end of the driveshaft to sense the rotational position and velocity of the rotor, and thus provide feedback to the controller, allowing the controller to adjust the drive signal and thereby control the rotational speed of the rotor in response to a variable mechanical load provided to the rotor by the pump.

Stator Laminations & Lamination Stack

In one embodiment, the motor is produced by modifying a commercially available brushless DC motor that is used in CNC machines. In other embodiments, the motor is manufactured from scratch.

In work leading up to the invention, the initial challenge was to determine whether it was possible to provide sufficient power at low voltages ($\approx$48 VDC) with this type of motor technology to drive the pump. 1 kW is a high power for this type of technology, and previous efforts in this regard have operated at much higher voltages (>100 V) in order to reduce the current and thus resistive losses in the stator windings and associated wiring. As motors in accordance with the present invention are to operate at low DC voltages, the resulting currents are much larger than they would be in prior art motors, which operate at much higher voltages.

The inventor determined that readily available laminations in the appropriate frame size (NEMA 56-66) do not have sufficient capacity to operate effectively at the required currents of around 25-35 A. Consequently, the lamination configuration was modified to increase the 'back iron path' (being the outer annular region joining the teeth/poles of the lamination to provide a flux path) and thus lower the magnetic flux density therein in view of the higher currents of 48 VDC operation.

In addition, the tooth profile of the stator laminations was modified to reduce the leading edge pole switching currents and thus ease the load on the controller. The resulting tighter tolerances due to the closer fitting rotor and stator (around 0.5 mm rather than the more than 1 mm clearance in a conventional motor) required modified techniques and jigs to be developed for assembly. This facilitates insertion of the rotor into the stator without damaging the rotor magnets.

The following steps are used to assemble the motor:
(i) Assemble motor stator into casing;
(ii) Assemble motor rotor onto shaft;
(iii) Insert both to assembly fixture;
(iv) Operate assembly fixture (the assembly fixture ensures correct and safe insertion of the rotor into the stator);
(v) fix and fasten the bearing in place;
(vi) check that the rotor is now free to rotate in the stator;
(vii) Fit encoder sensor A;
(viii) Fit encoder sensor B; and
(ix) couple the rotor to a slave motor (this allows the rotor to be rotated slowly in a controlled manner);
(x) attach encoder sensor A and B to test inputs;
(xi) attach motor phase windings to test inputs;
(xii) Engage slave drive (this rotates the rotor);
(xiii) manually align the encoder sensors A & B until test instruments signal correct alignment (a light);
(xiv) Fix encoder sensors in place;
(xv) stop slave drive;
(xvi) Switch test equipment to performance mode (Motor is now energised as it would be in the normal operation);
(xvii) run automated test sequence to quantify motor performance etc.

In addition to modifying the laminations, the wire used for the stator windings is also replaced with a larger diameter wire to reduce resistive losses and consequential heating. It will be appreciated that there is trade-off between using large diameter wire in the stator windings and making the stator laminations as large as possible to reduce the flux density therein to avoid saturation. For the same reason, it is important to use high grade magnetic steel for the laminations.

Another issue to be considered in embodiments where the rotor magnets are rare earth magnets, is the current density in the motor windings, which can cause localised heating of the laminations and ultimately failure of the motor's rare earth magnets.

In work leading up to the invention, these modifications to the laminations and windings demonstrated that it is possible to reach the desired power levels with this motor technology at 48V operating voltage with acceptable resistive losses and heating. However, there were remaining difficulties of motor control and torque output. In particular, the motor with the two modifications of the stator laminations as described above, although operational and sufficiently powerful, is not able to smoothly drive the peculiar load offered by a sewage pump.

To address these shortcomings, the lamination stack was modified by: (i) increasing the length/depth of the stack (i.e., along the longitudinal axis of the rotor) from 60 cm to 90 cm by adding more laminations (and consequently replacing the rotor magnets with correspondingly longer versions), and (ii) by skewing the stack to smooth the torque fluctuations of the motor fields. Although skewed lamination stacks have been used in specialised high speed AC motors, to the inventor's knowledge they have not been previously used in this type of DC application.

With the modifications to the laminations and to the lamination stack, the motor is much more effective and proved to be an (apparently) optimal drive for the sewage pump. In fact, the low speed torque was so high that it produced significant improvements in hydraulic performance in that more fluid is pumped at lower speeds due to the increased low speed torque.

Controller

Figure 12:
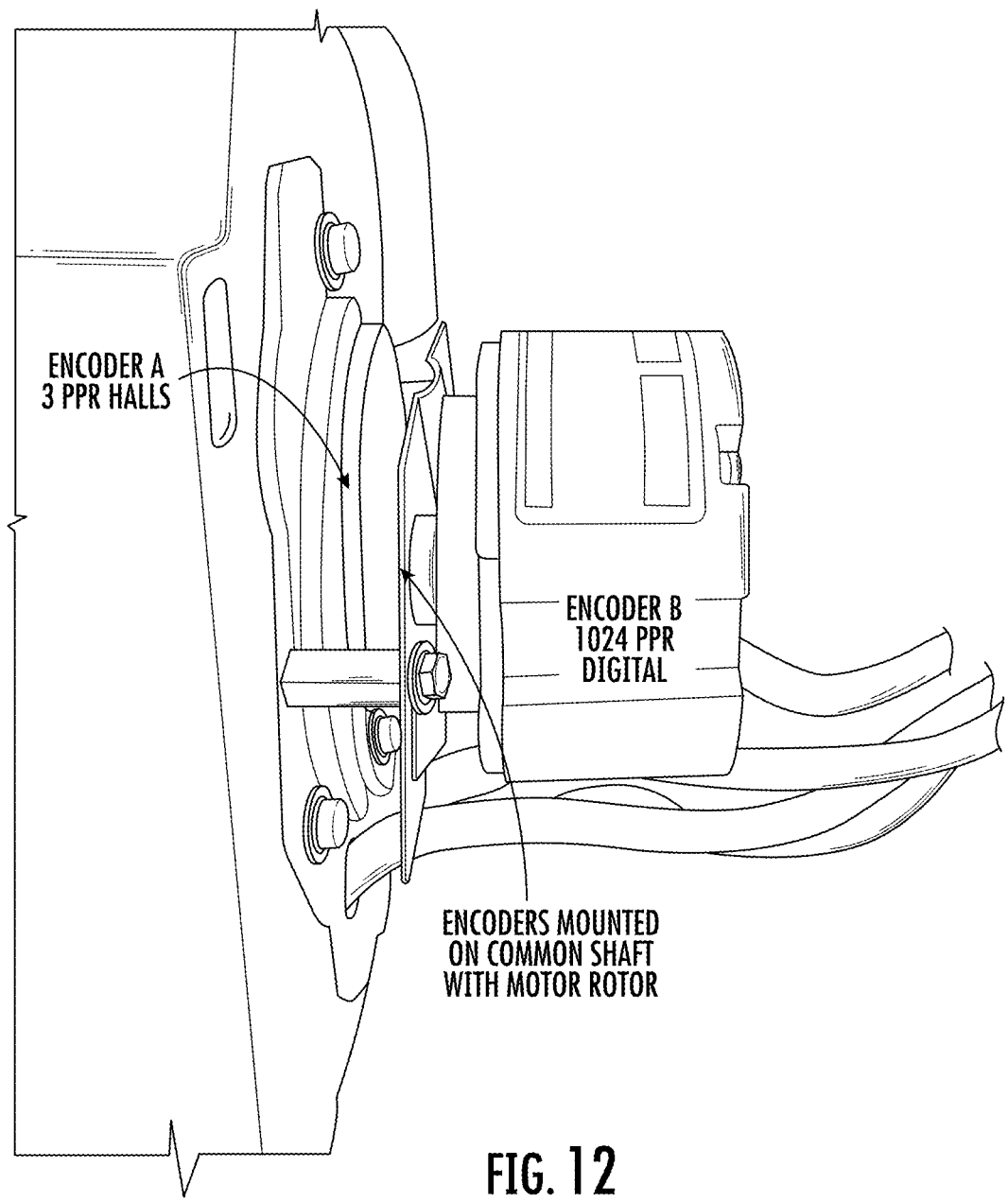
FIG. 12 is a photograph showing the two encoders attached to a rotor shaft of the motor.

With the modified motor as described above, the next task was to develop a controller to operate the modified motor. Commercial off-the-shelf controllers were found to be unsuitable because they were not able to start the modified motor reliably, given the variable pump load, and would often surge again due to the irregular pump torque. The inventor determined that the main issue was instability of the speed feedback system. Conventional controllers of this type have a Hall speed sensor system consisting of 1 or 3 Hall sensors per revolution to measure motor speed. The inventor determined that this standard configuration is too coarse to accurately map the irregular torque load of the pump. To address this difficulty, the motor described herein includes a high-resolution rotational velocity sensor coupled to the rotor driveshaft, as shown in FIG. 12, to provide high angular resolution sufficient to allow the controller to quickly correct the pump torque irregularities under variable load. In the described embodiment, a commercially available 1024-pulse optical encoder designed for use as a position sensor was used as the rotation sensor, providing a resolution of 1024 pulses per complete rotation of the driveshaft.

In the described embodiments, the controller 10 is a commercially available controller such as an Electromen EM347 or an ROBOTEQ SBI/HBM/MBL, but with modified software for the controller's microprocessor. The controller is configured to selectively use only one of the two speed sensors, depending on the current motor speed. At low rotational speeds, the usual three Hall sensors are used in the standard manner to determine the correct startup direction and trigger the first few commutations of stator winding currents. Once the rotor reaches a rotational speed of at least 100 rpm, the controller loop uses only the high resolution encoder, which provides the motor with greater speed and torque control. This helps the motor run smoothly with the fluctuating load that the pump provides.

In addition to the above, a temperature sensor 15 is buried in the coil windings to monitor the temperature of the rotor magnets and protect them from overheating. In the described embodiment, the temperature sensor is a negative temperature coefficient (NTC) thermistor. However, in another embodiment, the temperature sensor is a K-type thermocouple.

Noise Filtering

Modern motor controllers of this type often employ pulse width modulation (PWM) techniques to generate the waveforms required to drive the motor. The inventor determined that it is imperative to use PWM for the described sewage pumping application because it offers the highest overall electrical efficiencies and the lowest thermal losses. However, PWM systems generate electromagnetic noise which can affect other electrical components. In the case of the described motor, the resulting electrical noise contaminated the feedback system, creating control issues with the motor and pump. To address this difficulty, a series of filters was developed to alleviate the noise. In this case, the inventor determined that the noise was at such a high level due to the low voltage and high current application that it is necessary to mitigate the noise in two ways: (i) by applying tuned analogue filters 11, 13 to the feedback sensor signals, and (ii) to include software filters 12 in the controller 10.

The filters 11, 13 work in a number of ways; firstly by loading down the line which means the high frequency low power noise pulses are attenuated; and secondly by selectively filtering the PWM frequency at which the particular controller operates. The filter values are first calculated and then adjusted empirically whilst monitoring the signals with standard test equipment. In this way, the filters are tuned to provide the minimum noise for the PWM frequency and the cable parameters. This is important as changes to the cable type and/or length require different tunings. Thirdly, ensuring proper earthing and shielding of the signals, including paying careful attention to correct earthing schemes by monitoring earth currents and lowering the earth impedance with large earthing conductors.

Figure 13:
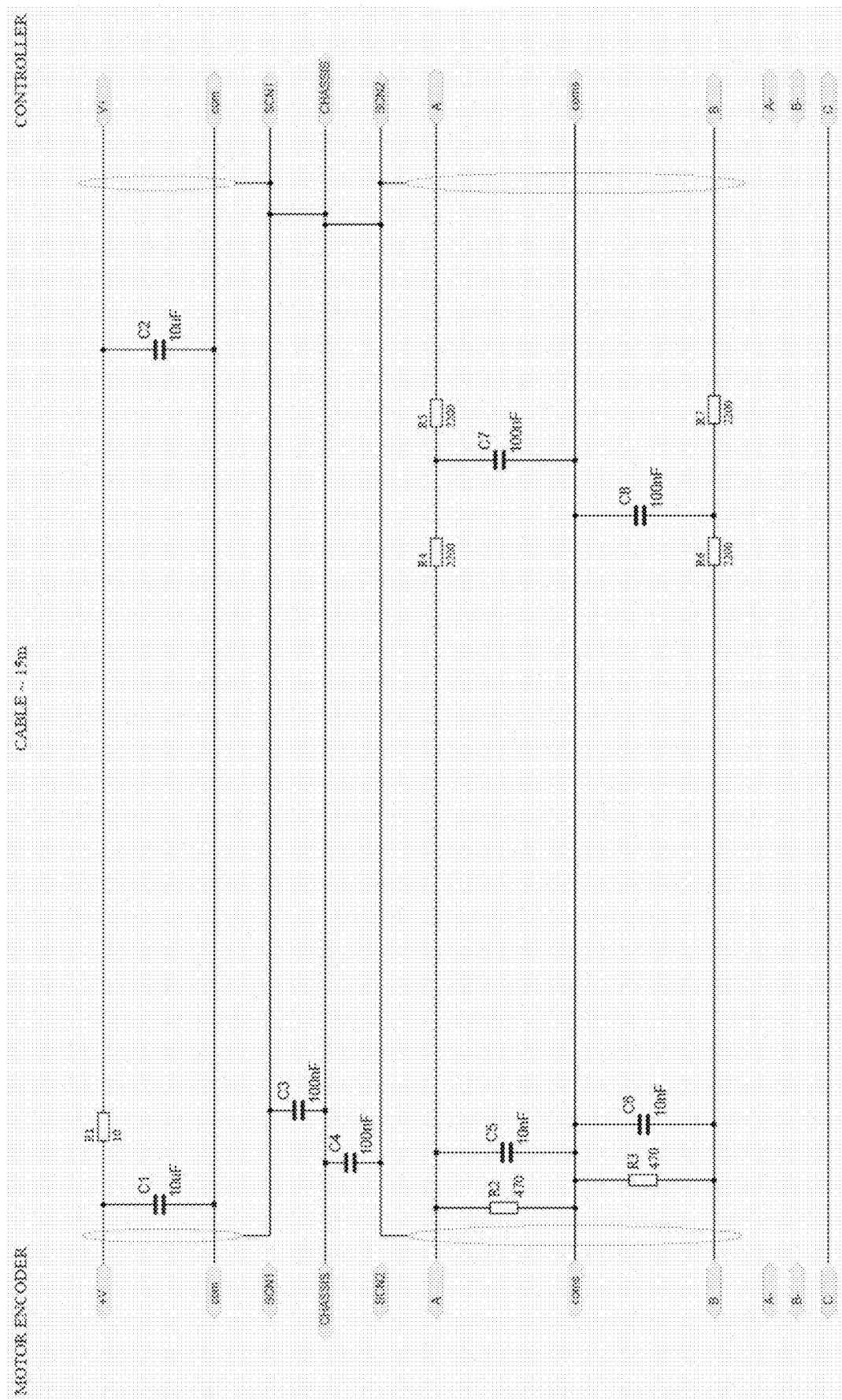
FIGS. 13 and 14 are circuit diagrams showing analog filter networks used to filter switching noise from the two interconnect cables that connect the two encoders to the motor controller, for embodiments where the length of the interconnect cables is about 15 m (FIG. 13) and 300 mm (FIG. 14).
Figure 14:
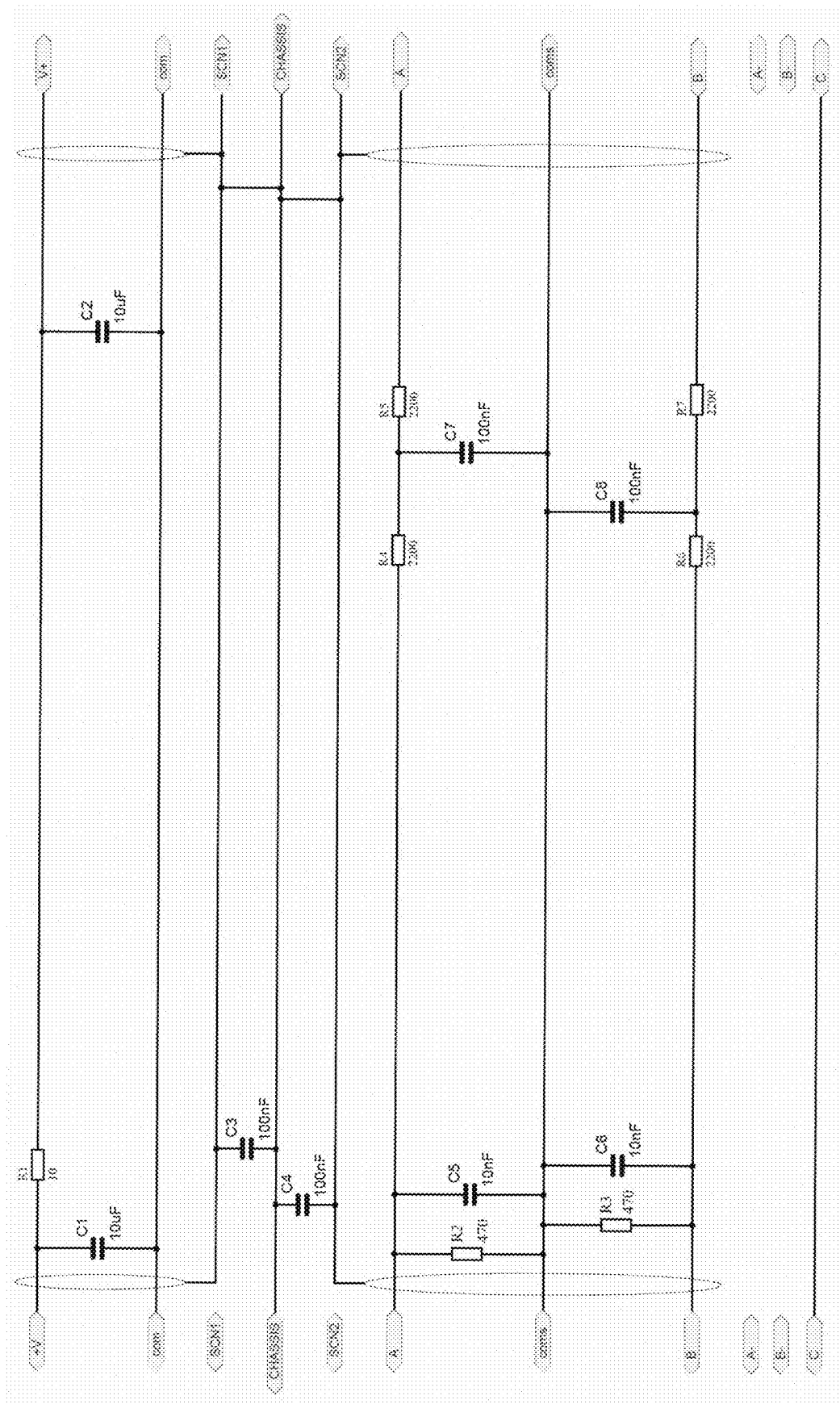

FIGS. 13 and 14 are circuit diagrams showing the analog filter networks used to filter switching noise from the two interconnect cables that connect the two encoders to the motor controller, for embodiments where the length of the interconnect cables is about 15 m (FIG. 13) and 300 mm (FIG. 14). In the latter embodiment, the filters for the temperature sensor interconnect include a 33 Hz low pass (common mode) filter and a 21 Hz T filter, and the filter for the current sensor 16 is set to 159 Hz. However, as will be apparent to those skilled in the art, the filter frequencies need to be tuned to the controller PWM switching frequency and to the specific parameters of the interconnect cables. For example, resistors R2 and R3 are tuned to the output impedance Zout of the controller 10, and resistors R4 to R7, and capacitors C7 and C8 to the cable length and cable type.

Sensors & Monitoring

In addition to the above, the motor includes standard sensors known to those skilled in the art to monitor motor performance, including the temperature of the windings and controller, motor phase voltages and currents, the supply voltage and current, as well as the motor load in the form of pressure and flow rate.

Information from the sensors is periodically transmitted to a remote monitoring system. This allows for a full mapping of the real time performance of the system and allows tuning of the controller and motor. These sensors are incorporated into the motor and controller, and are optimised for low power consumption by using ultra-low power electronics, and by putting the controller in low power states whilst it is not operating, in some cases switching it off all together. Of course this means the controller must wake up for the associated sensor control processes. The main motor power controller is optimised similarly for lowest quiescent power use by selecting low standby consumption components and ensuring that all processors and associated electronics are put in to low power sleep states whenever practical. In summary: if the motor is not operating and the input power condition is good (ie, the batteries are charged), then go to sleep mode; and if the motor is not operating and the input power condition is poor, then switch off.

Additional controls centred around the temperature sensor allow for additional starting currents to be applied if conditions permit, thus increasing the motor starting torque for pumping, this was mapped against the speed control loops. Since the inventor has determined that the motor is capable of greater than 1 kW short term overload (e.g., the inventor has started it at 2 kW), and the current winding temperatures are known (via the buried temperature sensors) the controller can be allowed to set the starting current limits to, say, 50 A instead of 25 A for, say, 3 s, etc.

For example, if the motor windings are cold, then the windings can be operated at full power before they reach a temperature that might damage the magnets. Thus the controller can allow full power, or if very cold, overdriven for, say, 2 s followed by a period of normal continuous full power. If the motor windings are warm, then the above can be modified to maximise starting torque, possibly at the expense of running torque.

A sewage pump with the improved electric motor described herein provides far superior low speed start up and hydraulic performance than comparable prior art AC mains powered or (AC inverter based) sewage pumping systems. In addition, the power requirements of the improved pump are approximately six times better than prior art pumping systems. For example, in one test both types of pump were operated under the same conditions and powered by identical solar/battery storage power sources. During the Australian winter of 2018, the improved pumping system described herein operated easily throughout a 4 day period of extra low solar insolation, whereas the prior art AC system flattened the batteries by the second night and stopped operating.

Although the motor of the present invention was developed for use with a low voltage power source, the embodiments of the motor described above are so much more efficient than prior art motors in terms of power use and power delivery (low speed startup, low speed pumping) that it is practical to use them on a mains AC connected system, not only for off grid applications. This can be done, for example, by running the mains into a simple switch mode power supply to step the voltage down to around 50 V to operate the motor. Thus the improvements are available with the addition of a relatively cheap power supply. Additionally, the described motors are so much more efficient than prior art motors that one of the described motors can pump from four houses, whereas prior art motors can only pump from one house.

Many modifications will be apparent to those skilled in the art without departing from the scope of the present invention.

What is claimed is:

1. An electric motor for viscous pumping,
   wherein the electric motor is a brushless DC motor and includes:
   a rotor with permanent magnets;
   a stator with a stack of laminations and windings wound therearound; and
   a controller to provide electronic commutation of electric current flowing through the windings;
   wherein the windings and the stack of laminations are configured to be driven by a low DC voltage of around 40-60 VDC at a continuous electric power of least 1 kW from the controller, the stack of laminations has a length of at least about 90 cm in a direction parallel to a longitudinal axis of the rotor, the permanent magnets and the stack of laminations are skewed with respect to one another to smooth torque fluctuations, and the controller includes a feedback circuit including a rotation sensor coupled to the rotor and having an angular resolution of at least 1/500th of a revolution to allow the controller to control the torque generated by the electric motor to a corresponding extent so that the motor can deliver a variable torque within each rotation of the rotor to maintain rotational speed under a correspondingly and unpredictably variable load such as driving a pump for viscous sewage.

2. The electric motor of claim 1, wherein the controller includes a PWM (pulse-width modulation) component to generate the electric current, and a filter component configured to filter noise generated by the PWM component.

3. The electric motor of claim 2, wherein the filter component includes an analogue filter to filter noise generated by the PWM component from the feedback circuit.

4. The electric motor of claim 2, wherein the filter component includes a digital filter to filter noise generated by the PWM component.

5. The electric motor of claim 1, further comprising Hall sensors to generate rotor position signals for use by the controller to determine rotational positions of the rotor for said electronic commutation, wherein the controller is configured to selectively use only either the Hall sensors or the rotation sensor to control the electric current flowing through the windings, in dependence of the rotor's rotational speed.

6. The electric motor of claim 1, wherein the laminations are configured with a large back path to avoid or reduce magnetic saturation of the laminations.

7. The electric motor of claim 1, wherein the stack of laminations has a thickness along a longitudinal axis of the rotor such that the electric motor can output a torque of at least 6-8 Nm.

8. The electric motor of claim 1, wherein each of the laminations includes teeth radially directed toward permanent magnets of the rotor, facing surfaces of the teeth and the permanent magnets being configured so that a corresponding magnetic field profile substantially minimizes the mean and impulse current referred to the windings.

9. The electric motor of claim 1, wherein each of the laminations includes teeth radially directed toward permanent magnets of the rotor, facing surfaces of the teeth and the permanent magnets being configured to reduce magnetic and quiescent losses.

10. The electric motor of claim 1, further comprising a temperature sensor to generate a signal indicative of a temperature of the permanent magnets of the rotor, the signal being coupled to an input of the controller, the controller being further configured to control the electric current flowing through the windings to avoid thermal damage to the permanent magnets.

11. The electric motor of claim 2, further comprising a temperature sensor to generate a signal indicative of a temperature of the permanent magnets of the rotor, the signal being coupled to an input of the controller, the controller being further configured to control the electric current flowing through the windings to avoid thermal damage to the permanent magnets.

12. The electric motor of claim 1, wherein the windings and the stack of laminations are configured to handle at least 1-2 kW of continuous electric power from the controller.

13. The electric motor of claim 1, wherein the windings and the stack of laminations are configured to handle at least 3 kW of peak electric power from the controller during startup.

14. The electric motor of claim 1, further comprising a DC power supply component to generate DC power for the electric motor from AC mains power so that the electric motor can be powered from AC mains power.

15. A method of producing an electric motor for viscous pumping, including the steps of:
   providing a rotor with permanent magnets;

coupling the rotor to a rotation sensor having an angular resolution of at least 1/500th of a revolution;

forming a stator with a stack of laminations and winding wire windings therearound such that the windings and the stack of laminations are configured to handle at least 1 kW of continuous electric power; and forming a controller to provide electronic commutation of electric current flowing through the windings, wherein the controller includes a feedback circuit coupled to the rotation sensor to allow the controller to control the torque generated by the electric motor to a corresponding extent;

wherein the electric motor is a brushless DC motor, the windings and the stack of laminations are configured to be driven by a low DC voltage of around 40-60 VDC at a continuous electric power of least 1 kW from the controller; the stack of laminations has a length of at least about 90 cm in a direction parallel to a longitudinal axis of the rotor, the permanent magnets and the stack of laminations and skewed with respect to one another to smooth torque fluctuations, and the feedback circuit includes a rotation sensor coupled to the rotor and having an angular resolution of at least 1/500th of a revolution to allow the controller to control the torque generated by the electric motor to a corresponding extent so that the motor can deliver a variable torque within each rotation of the rotor to maintain rotational speed under a correspondingly and unpredictably variable load such as driving a pump for viscous sewage.

16. The method of claim 15, wherein the step of providing includes obtaining a brushless DC motor configured to be driven by a low DC voltage of around 40-60 VDC, the brushless DC motor including:

the rotor with permanent magnets;

a stator with a second stack of laminations and second windings wound therearound; and a controller to provide electronic commutation of electric current flowing through the windings;

wherein the step of forming the stator includes removing the second stack of laminations and second windings wound therearound and replacing them with the laminations and windings of claim 14;

connecting the rotation sensor to the feedback circuit of the controller.

17. The method of claim 15, wherein the controller includes a PWM (pulse-width modulation) component to generate the electric current, and a filter component configured to filter noise generated by the PWM component, and the method includes the step of tuning the filter component to minimize noise in the feedback circuit of the controller.

18. The electric motor of claim 1, wherein the laminations have a tooth profile configured to reduce leading edge pole switching currents.

19. The electric motor of claim 1, wherein a gap between the stack of laminations and the stator is less than 1 mm.

20. The electric motor of claim 1, wherein a gap between the stack of laminations and the stator is about 0.5 mm.

\* \* \* \* \*